(12) United States Patent
Waissi et al.

(10) Patent No.: US 12,025,224 B1
(45) Date of Patent: Jul. 2, 2024

(54) NON-ROTATING CRANKDISK BEARING PROVIDING HYDRODYNAMIC LUBRICATION CONDITION FOR THE WAISSI INTERNAL COMBUSTION ENGINE

(71) Applicants: Gary Ray Robert Waissi, Cave Creek, AZ (US); Robert Waissi, Ann Arbor, MI (US)

(72) Inventors: Gary Ray Robert Waissi, Cave Creek, AZ (US); Robert Waissi, Ann Arbor, MI (US)

( * ) Notice: Subject to any disclaimer, the term of this patent is extended or adjusted under 35 U.S.C. 154(b) by 0 days.

(21) Appl. No.: 18/415,178

(22) Filed: Jan. 17, 2024

(51) Int. Cl.
*F16J 1/02* (2006.01)

(52) U.S. Cl.
CPC ..................... *F16J 1/02* (2013.01)

(58) Field of Classification Search
CPC ..................... F16J 1/02; F16J 1/04
See application file for complete search history.

(56) References Cited

U.S. PATENT DOCUMENTS

| | | |
|---|---|---|
| 5,402,755 A | 4/1995 | Waissi |
| 8,109,244 B1 | 2/2012 | Waissi |
| 8,534,240 B1 | 9/2013 | Waissi et al. |
| 8,875,673 B2 | 11/2014 | Waissi et al. |

OTHER PUBLICATIONS

Waissi, Gary R., Internal Combustion (IC) Engine with Minimum Number of Moving Parts, Futuristic Concepts in Engines and Components, (1995), pp. 61-64, SAE International, SP-1108, 950090, U.S.A.

*Primary Examiner* — Jacob M Amick
*Assistant Examiner* — Charles J Brauch

(57) ABSTRACT

An improvement to the Waissi type opposed piston internal combustion (IC) engine is proposed. The engine has at least one pair of aligned and opposed cylinders with one reciprocating double-headed piston assembly in each cylinder pair. The reciprocating motion of the piston is transmitted to the driveshaft by a rotating crankdisk, which is mounted off-centered to the driveshaft. When the crankdisk rotates, the flat linear sections on the outer perimeter of the bearing ring prevent the bearing ring from rotating, hydrodynamic lubrication conditions are created on both the outer flat linear interfaces and the inner perimeter of the bearing ring.

1 Claim, 4 Drawing Sheets

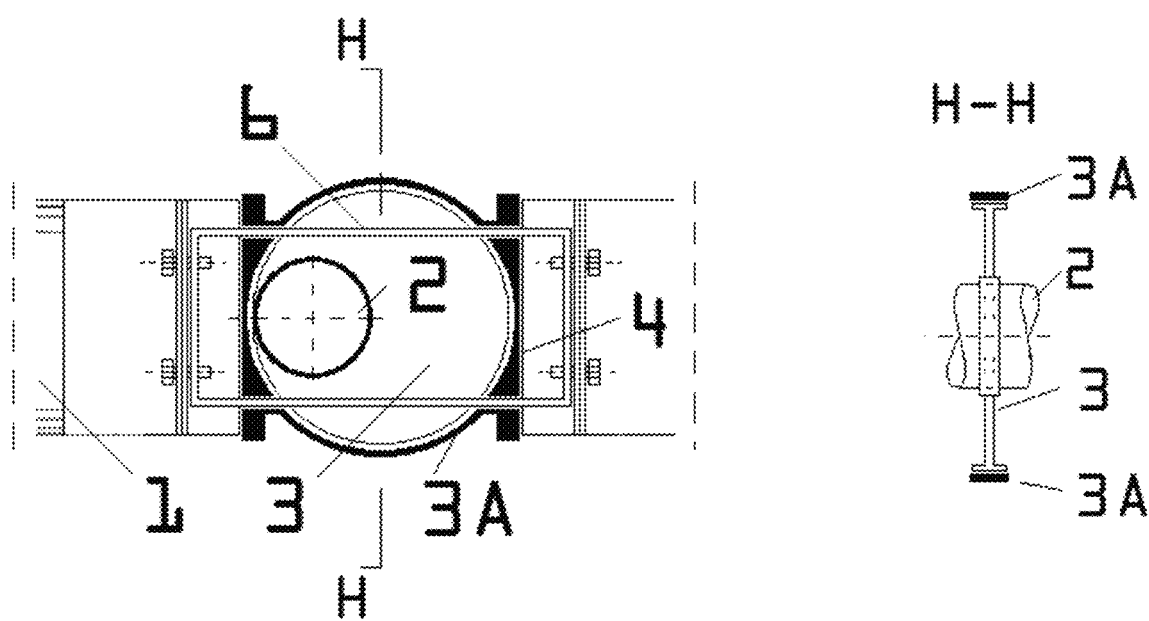

3A

NON-ROTATING CRANKDISK BEARING PROVIDING HYDRODYNAMIC LUBRICATION CONDITION FOR THE WAISSI INTERNAL COMBUSTION ENGINE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

CROSS-REFERENCE TO RELATED PATENTS

U.S. Pat. No. 8,875,673 B2 of Nov. 4, 2014
U.S. Pat. No. 8,534,240 B1 of Sep. 17, 2013
U.S. Pat. No. 8,109,244 B1 of Feb. 7, 2012
U.S. Pat. No. 5,402,755 of Apr. 4, 1995.

REFERENCES CITED

U.S. PATENT DOCUMENTS

| | | | |
|---|---|---|---|
| 8,875,673 B2 | November 2014 | Waissi G. and Waissi R. | 123/55.2, 74/48-51, 54,55;384/11,50 52.1, 55.5; |
| 8,534,240 B1 | September 2013 | Waissi G. and Waissi R. | 123/55.3; 74/48; 123/197.4; 123.55.2; 123/55.4; 74/51; 74/54 |
| 8,109,244 B1 | February 2012 | Waissi G. | 123/55.3; 123/197.4 |
| 5,402,755 | April 1995 | Waissi G. | 123/55 |

JOURNAL ARTICLES

Waissi, Gary R., Internal Combustion (IC) Engine with Minimum Number of Moving Parts, Paper No. 950090. Futuristic Concepts in Engines and Components. SAE SP-1108. pp. 61-64. (1995).

FIELD OF THE INVENTION

This invention relates to an internal combustion (IC) engine, and more particularly to the prior art reciprocating IC engine with opposed and aligned cylinders proposed by Waissi G. and Waissi R., U.S. Pat. No. 8,875,673 B2, Waissi G. and Waissi R., U.S. Pat. No. 8,534,240 B1, Waissi G., U.S. Pat. No. 8,109,244 B1, and Waissi G., U.S. Pat. No. 5,402,755, as well as disclosed in the journal article by Waissi G., SAE SP-1108 paper No. 950090 (1995).

BACKGROUND OF THE INVENTION

The prior art engine (U.S. Pat. No. 8,875,673 B2, U.S. Pat. No. 8,534,240 B1, U.S. Pat. No. 8,109,244 B1 and U.S. Pat. No. 5,402,755) is an internal combustion engine with opposed and aligned cylinders, called here the Waissi Engine. The Waissi Engine consists of at least one pair of aligned and opposed cylinders wherein a reciprocating double-headed piston is slidably mounted, and in which the double-headed piston axis intersects perpendicularly with the axis of a driveshaft. The reciprocating motion of the double-headed piston is transmitted to the driveshaft by a rotating crankdisk. The crankdisk is mounted off-centered to the driveshaft, which is rotably mounted to a crankcase. The crankdisk outer perimeter is annular forming a circle. The double-headed piston has two slots perpendicularly through its axis, one of which is to allow for a rotating movement of the crankdisk, and the other, to allow for the rotation of the driveshaft. The prior art further discloses that the double-headed piston may be assembled from multiple components or parts, which form an integrated, rigid, piston structure.

In conventional prior art IC engines (V-, in-line, opposed) the metal to metal contact between the piston connecting-rod big-end and the crankshaft is avoided by creating hydrodynamic lubrication condition in an oil film of the connecting-rod to crankshaft bearing (journal bearing). It is therefore, and in order to reduce friction and wear, highly desirable to create similar hydrodynamic lubrication conditions in the piston-to-bearing-to-crankdisk contact surfaces of the Waissi Engine.

The prior art improvement (SAE SP-1108, Paper No. 950090, Futuristic Concepts in Engines and Components, pp. 61-64, (1995)) to the Waissi Engine propose to reduce friction between the crankdisk annular bearing surface and piston internal bearing surfaces by a special bearing ring. Within this improvement the outer perimeter surface of the crankdisk acts as a bearing and slides inside the bearing ring. The crankdisk has a diameter and annular perimeter design that fits tightly but slidably inside the bearing ring. The bearing ring, with a diameter that fits in-between the piston slot linear bearing surfaces (or inside the piston slot), is intended to roll or slide on the piston slot bearing surface. The crankdisk perimeter and surface design correspond the conventional engine crankshaft—piston rod journal design to provide for hydrodynamic lubrication.

The prior art (U.S. Pat. No. 8,109,244 B1) improvement discloses specific designs for the crankdisk and bearing ring to provide for assembly as well as for holding the bearing ring in its designed location when the crankdisk rotates. The bearing ring is installed on the crankdisk to provide for hydrodynamic lubrication conditions between the crankdisk and the bearing ring, and for oil-splash lubrication between the bearing ring and the piston slot surface. This latter, oil-splash lubrication between the bearing ring outer surface and the piston slot surface, allows for metal-to-metal contact and thereby high friction. The bearing ring, with a diameter that fits in-between the piston slot linear bearing surfaces (or inside the piston slot), is intended to roll or slide on the piston slot bearing surface.

The prior art (U.S. Pat. No. 8,109,244 B1) discloses two specific distinct designs for the crankdisk-bearing combination. One of the designs consists of a machined or casted groove or depression on the crankdisk outer annular surface, in which one or both of the flanges or sides of the groove of the crankdisk are removable to allow for a flat I-profile bearing ring installation such that the bearing ring fits tightly but slidably in-between the flanges of the crankdisk annular bearing surface. The second, or alternative, design consists of a machined or casted groove on the inside surface of the bearing ring, forming a U-profile with flanges facing toward the center of the bearing ring, in which one or both of the flanges or sides of the groove are removable to allow for the U-profile bearing ring installation such that the crankdisk bearing surface fits tightly but slidably in-between the bearing ring flanges. Both designs propose modifications in form of casting or machining a U-profile on either the inside surface of the bearing ring or the annular outside surface of the crankdisk with one or both flanges or sides removable respectively. Both proposed designs provide for assembly as well as for holding the bearing ring in its designed location when the crankdisk rotates. Both proposed designs also provide for hydrodynamic lubrication condition between the crankdisk annular bearing surface and the inner surface of the bearing ring, and for oil-splash lubrication between the bearing ring outer surface and the piston slot surface. This latter, oil-splash lubrication between the bearing ring outer surface and the piston slot surface, allows for metal-to-metal contact and thereby high friction. The bearing ring, with a diameter that fits in-between the piston slot linear bearing surfaces (or inside the piston slot), is intended to roll or slide on the piston slot bearing surface.

The prior art (U.S. Pat. No. 8,534,240 B1) discloses a design, in which the bearing ring is held in its place in a slot bounded laterally only by the connecting members of the integrated double-headed piston assembly. The proposed design provides for assembly as well as for holding the bearing ring in its designed location when the crankdisk rotates. The proposed design also provides for hydrodynamic lubrication condition between the crankdisk annular bearing surface and the inner perimeter surface of the bearing ring, and for oil-splash lubrication between the bearing ring outer perimeter surface and the piston slot surface. This latter, oil-splash lubrication between the bearing ring outer surface and the piston slot surface, allows for metal-to-metal contact and thereby high friction. The bearing ring, with a diameter that fits in-between the piston slot linear bearing surfaces (or inside the piston slot), is intended to roll or slide on the piston slot bearing surface.

The prior art (U.S. Pat. No. 8,875,673 B2) discloses a design, in which the linear bearing surface of the piston slot wall is provided with flanges (a U-shaped groove) to hold the bearing ring in its designed position, when the crankdisk rotates. In the proposed design the flanges are fixed, as the two piston heads are assembled together to form an integrated rigid piston structure. The proposed design provides for assembly as well as for holding the bearing ring in its designed location when the crankdisk rotates. The proposed design also provides for hydrodynamic lubrication condition between the crankdisk annular bearing surface and the bearing ring inner perimeter surface, and for oil-splash lubrication between the bearing ring outer perimeter surface and the piston slot surface. This latter, oil-splash lubrication between the bearing ring outer surface and the piston slot surface, allows for metal-to-metal contact and thereby high friction. The bearing ring, with a diameter that fits in-between the piston slot linear bearing surfaces (or inside the piston slot), is intended to roll or slide on the piston slot bearing surface.

As summarized above, the prior art proposes a bearing ring—crankdisk combination design that will require machining or casting a groove or depression on either the inner perimeter surface of the bearing ring or the outer annular surface of the crankdisk with one or two flanges removable to provide for assembly, or machining or casting a groove (with flanges) on the linear bearing surface of the piston slot wall, or, alternatively, to hold the bearing in its designed place by the piston head connecting members when the crankdisk rotates. The prior art proposed solutions include also an alternative utilization of roller- or ball bearings instead of a bearing ring. The prior art bearing ring, with a diameter that fits in-between the piston slot linear bearing surfaces (or inside the piston slot), is intended to roll or slide on the piston slot bearing surface. The prior art proposed solutions further include oil-splash lubrication between the bearing ring outer perimeter surface and the piston slot surface. This latter, oil-splash lubrication between the bearing ring outer surface and the piston slot surface, allows for metal-to-metal contact and thereby high friction.

The subject of this invention is to provide for hydrodynamic lubrication conditions between the contact surface of the bearing ring outer surface and the piston slot wall linear flat surface to reduce the friction on this interface, while maintaining the hydrodynamic lubrication conditions between the bearing ring inner perimeter surface and the crankdisk outer perimeter surface.

BRIEF SUMMARY OF THE INVENTION

A main object of the present invention is to provide an improvement to the Waissi Engine, which provides for hydrodynamic lubrication condition between the bearing ring outer surface and the piston slot wall, while maintaining hydrodynamic lubrication condition between the annular outer surface of the crankdisk and the bearing ring. The invention comprises the features hereinafter described and particularly pointed out in the claims. The following description and the attached drawings set forth in detail certain illustrative, however indicative, embodiment of the invention, of but a few ways in which the principles of the invention may be employed.

The main object of this invention is accomplished by modifying the outer perimeter shape and function of the bearing ring of the prior art Waissi Engine. The prior art bearing ring utilizes an annular (perfectly circular) inner perimeter shape of the bearing ring, which slidably, under hydrodynamic conditions, engages the annular (perfectly circular) shape of the outer perimeter of the crankdisk. The prior art bearing ring outer annular (perfectly circular) surface rolls or slides on the flat linear piston base slot wall. The proposed bearing ring is modified to provide a shape for the outer perimeter of the bearing ring, which has two flat linear parallel surface sections engaging slidably the two flat linear parallel slot surfaces of the piston.

In the proposed arrangement, the flat linear surface sections of the outer perimeter of the bearing ring engage the piston slot wall flat linear surfaces preventing the bearing ring from rotating. Within the proposed design, further, the flat linear outer surface sections of the bearing ring, engaging tightly but slidably inside the piston slot, slide under hydrodynamic conditions on the piston slot linear wall surfaces when the crankdisk rotates.

The annular (perfectly circular) inner perimeter surface of the flat bearing ring is provided with a groove to aid oil distribution around and along the inner surface of the bearing ring. The groove, around the inner surface of the bearing ring, is approximately centered and parallel to the sides of the bearing ring. The outer perimeter of the bearing ring is provided with two flat linear sections, with each having at least one oil distribution hole to allow lubrication oil to pass from the space in-between the crankdisk outer annular surface and the bearing ring inner surface, to the space between the bearing ring outer surface flat linear section and the flat linear piston slot wall.

In order to provide for hydrodynamic lubrication conditions, oil is pumped under pressure through the inside cavity of the driveshaft through provided channels inside the crankdisk to the space between the crankdisk outer perimeter surface and the bearing ring inner perimeter surface.

The oil under pressure will flow in the provided groove around the inner surface of the bearing ring and through one or more of the holes, provided through the bearing ring flat linear surface sections, to the lubrication space between the flat linear outer surface of the bearing ring and the parallel flat linear surface of the piston slot.

Within the proposed design the bearing ring is installed in such a way that the flat linear bearing ring surfaces on the outer perimeter of the bearing ring fit and slide inside the piston slot wall linear bearing surfaces, while at the same time allowing a small lateral movement and allowing the flat linear outer perimeter surfaces of the bearing ring to slide under hydrodynamic conditions against the piston slot walls. Within the proposed design, also, the flat inner annular perimeter of the bearing ring fits tightly but slidably on the crankdisk, and slides under hydrodynamic conditions on the crankdisk annular perimeter surface.

BRIEF DESCRIPTION OF THE SEVERAL VIEWS OF THE DRAWINGS

The main object, features and advantages of this invention will become apparent from a consideration of the following description, the appended claims and the accompanying drawings in which:

FIG. 2a shows the center section of the engine of FIG. 1. In particular, FIG. 2a shows the piston mantel 1, driveshaft 2, crankdisk 3, bearing ring 3A with a modified outer perimeter having flat linear bearing surfaces against the parallel linear bearing surfaces of the piston slot wall 4, and the connecting frame 6. FIG. 2a, cross section H-H shows the driveshaft 2, crankdisk 3, bearing ring 3A. Other parts and components are not shown for clarity.

FIG. 2c shows the bearing ring 3A outer surface flat linear sections, which provide for flat linear, parallel, contact surface areas to face the flat linear parallel piston slot walls, and prevent the bearing ring from rotating. The bearing ring 3A includes a groove (cavity) for oil distribution, approximately centered, on- and around the inner perimeter of the bearing ring, as well as at least one hole on each flat linear parallel outer surface of the bearing ring connecting the oil distribution groove to the outer perimeter flat linear surface. The groove and oil passage holes are not shown.

DETAILED DESCRIPTION OF THE INVENTION

Figure 1:
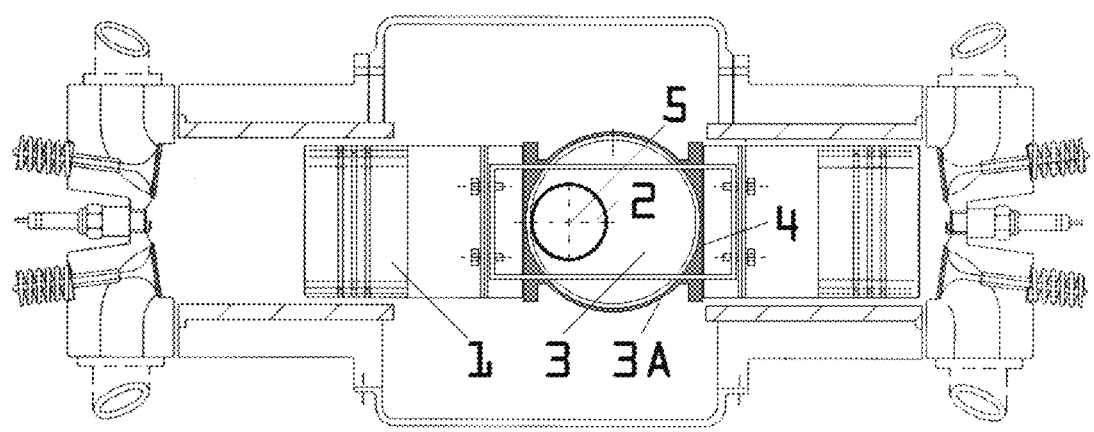
FIG. 1 (adapted from U.S. Pat. No. 8,875,673 B2, U.S. Pat. No. 8,534,240 B1, U.S. Pat. No. 8,109,244 B1, U.S. Pat. No. 5,402,755 and from SAE SP-1108, Paper No. 950090, Futuristic Concepts in Engines and Components, pp. 61-64, (1995)) is a section view of the Waissi Engine, in which a double-headed piston 1 reciprocates, perpendicularly to a driveshaft 2, in aligned and horizontally opposed cylinders. The rigid double-headed piston assembly consists of two piston heads attached to each other by two connecting members, or frame structures, 6 (one of those is shown in FIG. 2a). These two connecting members are rectangular- or nearly rectangular frames, each end of which is attached to the side of the piston head base-structure. It is noted that at least one connecting member is required between the piston heads to integrate the two piston heads into one piston structure. The connecting members provide two slots perpendicularly through the axis of the piston structure, one of which is to allow for a rotating movement of the crankdisk 3, and up-and-down, non-rotating, movement of the bearing ring 3A installed on the crankdisk 3, and the other slot, to allow for the rotation of the driveshaft 2. The bearing ring 3A outer flat linear contact surface interfacing with piston slot wall linear contact surface is identified as 4 in FIG. 1. Other parts and components are not shown for clarity.

In FIG. 1 (adapted from U.S. Pat. No. 8,875,673 B2, U.S. Pat. No. 8,534,240 B1, U.S. Pat. No. 8,109,244 B1, U.S. Pat. No. 5,402,755 and from SAE SP-1108, Paper No. 950090, Futuristic Concepts in Engines and Components, pp. 61-64, (1995)) the double-headed piston 1 reciprocates, perpendicularly to the driveshaft 2, in the aligned and horizontally opposed cylinders. The driveshaft 2 is rotably mounted to the crankcase. The center axis 5 of the driveshaft is the center of rotation of the driveshaft. The crankdisk 3 is off-centered attached to the driveshaft 2. The crankdisk 3 is located at the piston axis.

The outer annular perimeter surface of the crankdisk 3 acts as a bearing and slides under hydrodynamic conditions inside the non-rotating bearing ring 3A, which slides under hydrodynamic conditions on the linear bearing surface of the piston slot wall 4. The piston slot of the integrated double-headed piston is axially provided through the piston 1 to allow for the rotation of the crankdisk 3 inside the bearing ring 3A. Hydrodynamic conditions are created by oil being pumped under pressure through channels or cavities provided through the crankdisk connecting the center of the driveshaft oil supply to the outer perimeter bearing surface of the crankdisk.

The crankdisk 3 has a diameter that fits tightly but slidably inside the bearing ring 3A. The crankdisk 3 has a perimeter design, known from the prior art, that provides for hydrodynamic lubrication conditions between the crankdisk 3 and the bearing ring 3A. The inside distance between the linear bearing surface slot walls of the two integrated piston heads is such that it will accommodate the crankdisk 3 and the bearing ring 3A including an acceptable tolerance known from the prior art.

Figure 2B:
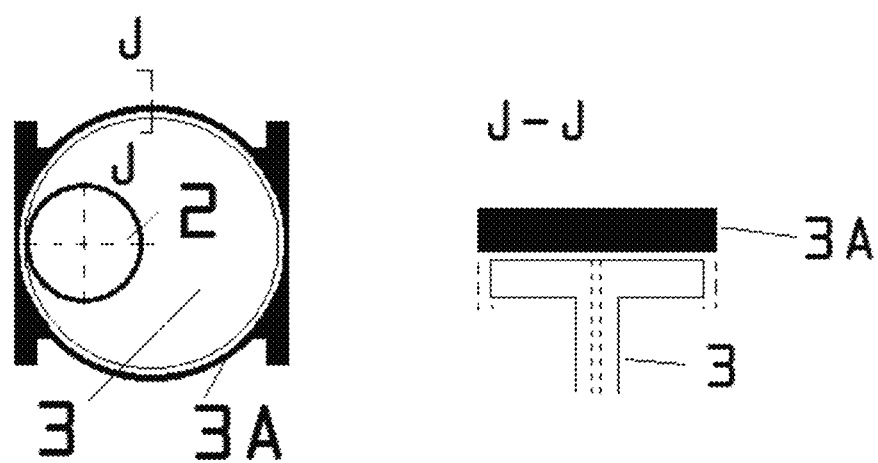
FIG. 2b shows the drive shaft 2, crankdisk 3, bearing ring 3A, and identifies the cross section J-J. Section J-J shows an enlarged view of the cross section of the top part of the crankdisk 3 bearing ring 3A interface. It is also noted, that the bearing ring 3A is shown, in section J-J, to be wider than the crankdisk annular bearing perimeter surface for the purpose of allowing a small lateral movement of crankdisk.
Figure 2C:
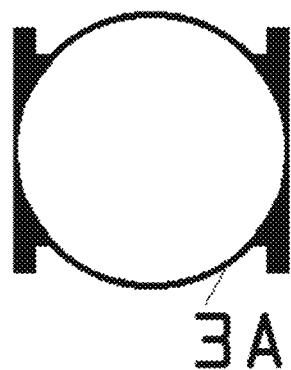
FIG. 2c shows the key element of this invention, the bearing ring 3A. The bearing ring 3A has an annular (perfectly circular) inner perimeter, and an outer perimeter with flat, linear, parallel surface sections on opposite sides of the bearing ring.

In the preferred embodiment an annular flat inner perimeter profile bearing ring 3A is installed on the crankdisk as shown in FIG. 1, FIG. 2a and FIG. 2b. The bearing 3A has two parallel outer perimeter flat linear surface sections on opposite sides to provide for bearing ring linear surface to piston slot wall linear surface interface, and to prevent the bearing ring from rotating. FIG. 2b, cross-section J-J, also shows that the bearing ring 3A is wider than the crankdisk 3 bearing surface for the purpose of allowing for a small lateral movement of the crankdisk on the driveshaft 2 without reducing the effective size of the bearing surface.

The proposed design has the following benefits when compared to the prior art (U.S. Pat. No. 8,875,673 B2, U.S. Pat. No. 8,534,240 B1, U.S. Pat. No. 8,109,244 B1, U.S. Pat. No. 5,402,755 and from SAE SP-1108, Paper No. 950090, Futuristic Concepts in Engines and Components, pp. 61-64, (1995)) design: the bearing ring, with inner perimeter annular design and approximately centered inner annular groove, and oil lubrication holes connecting the inner annular groove of the bearing ring to the bearing ring outer linear surfaces facing the piston slot wall, provides for hydrodynamic lubrication between both the outer perimeter of the crankdisk and the inner perimeter of the bearing ring, and the outer linear flat surfaces of the bearing ring and the flat linear piston slot walls. The prior art solutions allow the bearing ring to rotate, and do not provide for hydrodynamic lubrication between the outer perimeter flat linear surface of the bearing ring and the flat linear piston slot walls. The proposed design accomplishes both hydrodynamic lubrication objectives, between the crankdisk and the bearing ring, and the bearing and the piston slot wall, at the same time.

Without loss of generality, different piston head connecting member designs and arrangements that form a rigid double-headed piston and provide for keeping the bearing ring in its designed position, and different bearing ring outer perimeter designs that keep the bearing ring from rotating and allow hydrodynamic lubrication between the crankdisk and the bearing ring, and the bearing and the piston slot wall, when the crankdisk rotates do not change the bearing ring function, do not change the bearing ring to crankdisk lubrication arrangement, do not change the bearing ring to piston slot wall lubrication arrangement and function, and, therefore, do not constitute a different invention.

For clarity and simplicity, significant engine parts are shown in FIG. 1, FIG. 2a, FIG. 2b, and FIG. 2c only.

Further, it is appreciated from the FIG. 1, FIG. 2a, FIG. 2b, and FIG. 2c, and the above description, summarily that according to the present invention, since the crankdisk 3 slides under hydrodynamic conditions inside the improved bearing ring 3A, which slides under hydrodynamic conditions on the piston slot wall bearing surface 4, metal to metal high friction contact between the crankdisk outer perimeter surface and the bearing ring inner perimeter surface, as well as between the outer perimeter of the bearing ring flat linear surfaces and the piston slot wall linear surfaces are avoided with the proposed improvements. While a bearing ring, when the crankdisk rotates, has been proposed in the referenced prior art, the specific design and requirements, which provide for lubrication under hydrodynamic conditions via an inner perimeter groove and oil passage holes through the flat linear sections of the bearing ring, and the modification to provide for two parallel flat linear sections on the outer perimeter of the bearing ring, which face against the flat linear walls of the piston slot, and which prevent the bearing ring from rotating, as presented above and in FIG. 2a, FIG. 2b and FIG. 2c have not been proposed for the Waissi Engine. The proposed design of the bearing ring and bearing ring assembly, with respect to assembly of the crankdisk—bearing ring—integrated piston assembly, as well as the function of the bearing in terms of providing lubrication to the interface between the bearing ring flat linear section and the piston slot wall flat linear section when the crankdisk rotates, summarily constitute a significant difference from the prior art for the Waissi Engine.

A bearing ring 3A substitution or replacement by other types of bearings or bearing rings which accomplish the same function do not constitute a different invention. With respect to assembly, bearing weight, dynamic engine balancing, wear and tear, cost of bearings, and total cost of engine manufacture, the proposed solutions appear to be the simplest, most durable, and most cost effective.

What is claimed is:
1. An improved internal combustion engine, comprising: a driveshaft and means mounting the driveshaft for rotation about an axis; at least one pair of aligned and opposed cylinders; at least one double-headed piston, having at least one rigid connection between the piston heads forming an integrated rigid piston structure, reciprocating in said pair of cylinders; a circular crankdisk, for each said piston structure respectively, installed on said driveshaft, and allowing for a small lateral movement of said crankdisk on said driveshaft; the said crankdisk having an outer annular surface formed about a center that is laterally offset from the center of rotation of the said driveshaft, and attached to the said driveshaft; said piston structure body having a first slot, a second slot perpendicular to the first slot, the first slot being perpendicular to the piston axis and allowing the rotating movement of the driveshaft, and the second slot, with two flat linear piston slot base surfaces, allowing the rotating movement of the crankdisk, a bearing ring with a flat annular inner perimeter, mounted on the annular flat surface of the said crankdisk, which engages slidably under hydrodynamic conditions the annular surface of the said crankdisk;
  wherein the improvement comprises of a bearing ring outer perimeter surface having two parallel flat linear bearing surface sections, on opposite sides of said bearing ring, engaging slidably, under hydrodynamic conditions, said two flat linear piston slot surfaces respectively when the crankdisk rotates;
  whereby said bearing ring outer perimeter dimension between said flat linear bearing surfaces is such that said bearing ring with said flat linear bearing surfaces, facing said piston slot wall linear surfaces, fits slidably inside said piston slot;
  whereby said flat linear surface sections on the outer perimeter of said bearing ring, engaging said piston slot flat linear surfaces, prevent said bearing ring from rotating;
  whereby said annular inner perimeter surface of said bearing ring is provided with a groove or cavity, located about centered and parallel to the sides of said bearing ring, to allow oil distribution around and along the inner surface of said bearing ring;
  whereby said two flat linear sections, on the outer perimeter of said bearing ring, each have at least one hole through said bearing ring to allow lubrication oil to pass from the space in-between said crankdisk outer annular surface and said bearing ring inner surface to the space between said bearing ring flat linear outer surface section and said flat linear piston slot wall;
  whereby lubrication oil is pumped under pressure through the inside cavity of said driveshaft through provided oil channels inside said crankdisk to the space between said crankdisk outer perimeter surface and said bearing ring inner perimeter surface, and in said groove around the inner surface of said bearing ring and through one or more said holes to the lubrication space between said flat linear outer surface of said bearing ring and the parallel flat linear surface of said piston slot wall;
  whereby said crankdisk with the aid of said bearing ring transmits the piston force of said double-headed piston to said driveshaft and causes said driveshaft to rotate about its axis.

* * * * *